US012800355B2

(12) United States Patent
Miyake

(10) Patent No.: US 12,800,355 B2
(45) Date of Patent: Nov. 17, 2026

(54) SCALE, ENCODER AND MANUFACTURING METHOD OF SCALE

(71) Applicant: MITUTOYO CORPORATION, Kawasaki (JP)

(72) Inventor: Kosaku Miyake, Kanagawa (JP)

(73) Assignee: MITUTOYO CORPORATION, Kawasaki (JP)

(*) Notice: Subject to any disclaimer, the term of this patent is extended or adjusted under 35 U.S.C. 154(b) by 163 days.

(21) Appl. No.: 18/815,089

(22) Filed: Aug. 26, 2024

(65) Prior Publication Data

US 2025/0085138 A1 Mar. 13, 2025

(30) Foreign Application Priority Data

Sep. 8, 2023 (JP) ................................ 2023-146193

(51) Int. Cl.

| | |
|---|---|
| ***G01D 5/245*** | (2006.01) |
| ***B23K 26/352*** | (2014.01) |
| ***B23K 26/362*** | (2014.01) |
| ***G01B 5/00*** | (2006.01) |
| ***G01D 5/20*** | (2006.01) |
| ***G01D 5/38*** | (2006.01) |

(52) U.S. Cl.

CPC .......... *G01D 5/245* (2013.01); *B23K 26/355* (2018.08)

(58) Field of Classification Search

CPC . G01D 5/20; G01D 5/245; G01D 5/38; G02B 5/00; G02B 5/18; B23K 26/362; B23K 26/352

See application file for complete search history.

(56) References Cited

U.S. PATENT DOCUMENTS

| | | | | |
|---|---|---|---|---|
| 7,931,841 B2 * | 4/2011 | Huizinga | ............ B29C 35/0888 359/530 |
| 2016/0054151 A1 | 2/2016 | Nozawa | |
| 2018/0058883 A1 | 3/2018 | Cook | |
| 2023/0182232 A1 | 6/2023 | Miyake | |

FOREIGN PATENT DOCUMENTS

| | | | |
|---|---|---|---|
| JP | H04211202 * | 8/1992 | ............... G02B 5/18 |
| JP | 2003-241392 A | 8/2003 | |
| JP | 2016-044967 A | 4/2016 | |
| JP | 2018-031777 A | 3/2018 | |

* cited by examiner

*Primary Examiner* — Neel D Shah

(74) *Attorney, Agent, or Firm* — Rankin, Hill & Clark LLP

(57) ABSTRACT

A manufacturing method of a scale includes forming a metal-containing layer on a resin layer that is provided on at least a first face of a substrate, forming an outline of a pattern on the metal-containing layer by irradiating a first laser to the metal-containing layer from a side opposite to the substrate, irradiating a second laser to a margin outside of the outline of the metal-containing layer from a side of a second face of the substrate opposite to the first face, and peeling a part of the metal-containing layer corresponding to the margin.

16 Claims, 12 Drawing Sheets

SCALE, ENCODER AND MANUFACTURING METHOD OF SCALE

CROSS-REFERENCE TO RELATED APPLICATION

This application is based upon and claims the benefit of priority of the prior Japanese Patent Application No. 2023-146193, filed on Sep. 8, 2023, the entire contents of which are incorporated herein by reference.

FIELD

A certain aspect of embodiments described herein relates to a scale, an encoder and a manufacturing method of the scale.

BACKGROUND

Scales in which conductive patterns are formed on a substrate have been disclosed (see, for example, Japanese Patent Application Publication No. 2018-031777, Japanese Patent Application Publication No. 2003-241392, and Japanese Patent Application Publication No. 2016-044967).

SUMMARY

In one aspect, the present invention aims to provide a scale, an encoder, and a manufacturing method of the scale of which conductor patterns can be formed in a short period of time while reducing the use of chemicals that have a high environmental impact.

According to an aspect of the present invention, there is provided a manufacturing method of a scale including: forming a metal-containing layer on a resin layer that is provided on at least a first face of a substrate; forming an outline of a pattern on the metal-containing layer by irradiating a first laser to the metal-containing layer from a side opposite to the substrate; irradiating a second laser to a margin outside of the outline of the metal-containing layer from a side of a second face of the substrate opposite to the first face; and peeling a part of the metal-containing layer corresponding to the margin.

According to an aspect of the present invention, there is provided a scale including: an optically transparent substrate that has a resin layer on a first face thereof; and a plurality of conductor patterns that are provided on the resin layer and have a structure in which a plurality of metal gratings are formed at intervals, wherein spotted patterns are formed at intervals along two dimensional directions on a region of the resin layer other than the conductor patterns.

DESCRIPTION OF EMBODIMENTS

For example, conductor patterns can be formed by processing a thick copper foil on a surface of materials such as printed circuit boards using lithography and wet etching. However, wet etching requires the use of chemicals that have a high environmental impact. Therefore, it has been considered to form conductor patterns using laser processing. However, forming conductor patterns using laser processing takes a long time.

The following is a description of embodiments, with reference to the accompanying drawings.

First Embodiment

Figure 1A:
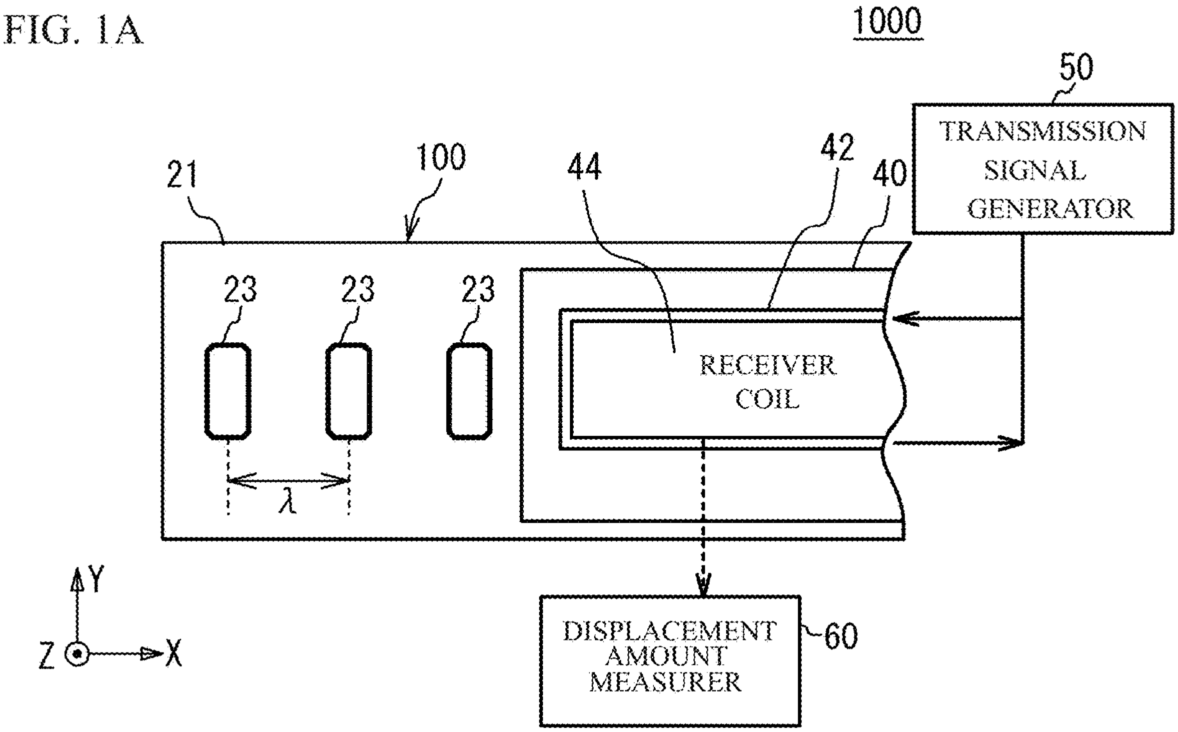
FIG. 1A is a diagram illustrating a configuration of an electromagnetic induction encoder 1000 including a scale according to a first embodiment.

FIG. 1A is a diagram illustrating a configuration of an electromagnetic induction encoder 1000 including a scale 100 according to a first embodiment. As illustrated in FIG. 1A, the electromagnetic induction encoder 1000 includes the scale 100 and a detection head 40 that moves relatively in a measurement axis direction. The scale 100 and the detection head 40 each have a substantially flat plate shape and are arranged opposite each other with a predetermined gap therebetween. The electromagnetic induction encoder 1000 also includes a transmission signal generator 50 and a displacement amount measurer 60. In FIG. 1A, the X-axis represents the displacement direction (measurement axis) of the detection head 40. In the plane formed by the scale 100, the direction perpendicular to the X-axis is defined as the Y-axis. The direction perpendicular to the plane formed by the scale 100 is defined as the Z-axis.

The detection head 40 is provided with a transceiver coil 42 and a receiver coil 44. The transceiver coil 42 is a rectangular coil having a length in the X-axis direction. The receiver coil 44 is disposed inside the transceiver coil 42.

The scale 100 is provided with a plurality of conductor patterns 23 made of a conductor on the first face of the substrate 21. The plurality of conductor patterns 23 are arranged with a fundamental period λ along the X-axis direction. The fundamental period λ corresponds to the distance between the centers of two adjacent conductor patterns 23 in the X-axis direction. The conductor pattern 23 is, for example, a plate-shaped pattern without holes or a closed loop coil. The conductor pattern 23 is electromagnetically coupled to the transceiver coil 42 and also to the receiver coil 44.

The transmission signal generator 50 generates a transmission signal of a single phase AC and supplies the generated transmission signal to the transceiver coil 42. In this case, magnetic flux is generated in the transceiver coil 42. Thus, an electromotive current is generated in the plurality of conductor patterns 23. The plurality of conductor patterns 23 are electromagnetically coupled with the magnetic flux generated by the transceiver coil 42 and generate magnetic flux fluctuating in the X-axis direction in a predetermined spatial period. The magnetic flux generated by the conductor patterns 23 generates an electromotive current in the receiver coil 44. The electromagnetic coupling between the conductor pattern 23 and the receiver coil 44 fluctuates in accordance with the displacement amount of the detection head 40.

Thereby, a sine wave signal of the same period as the fundamental period 2 is obtained. Therefore, the receiver coil 44 detects a phase of the magnetic flux generated by the plurality of conductor patterns 23.

Figure 1B:
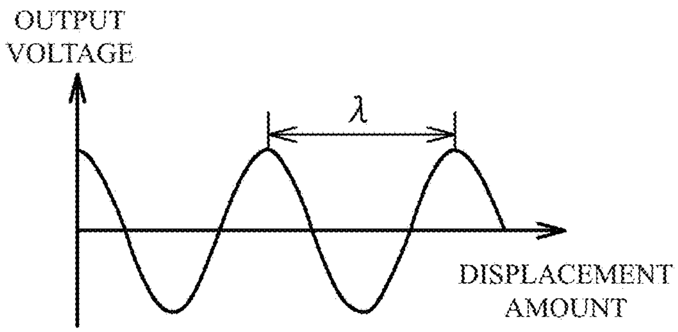
FIG. 1B illustrates a sine wave signal having a same period as a fundamental period λ.

The displacement amount measurer 60 can use this sine wave signal as a digital quantity with the minimum resolution by electrically interpolating it, and measures the displacement of the detection head 40. In FIG. 1B, the horizontal axis represents the displacement of the detection head 40, and the vertical axis represents the output voltage of the receiver coil 44

The transceiver coil 42, the receiver coil 44, and the conductor patterns 23, which are electromagnetically coupled to each other, form one track. Therefore, in this embodiment, the electromagnetic induction encoder 1000 has one track. In addition, the electromagnetic induction encoder 1000 may have two tracks arranged at a predetermined interval in the Y-axis direction. In this case, the fundamental period 2 may be different between the two tracks. This allows it to function as an absolute (ABS) encoder.

Figure 1C:
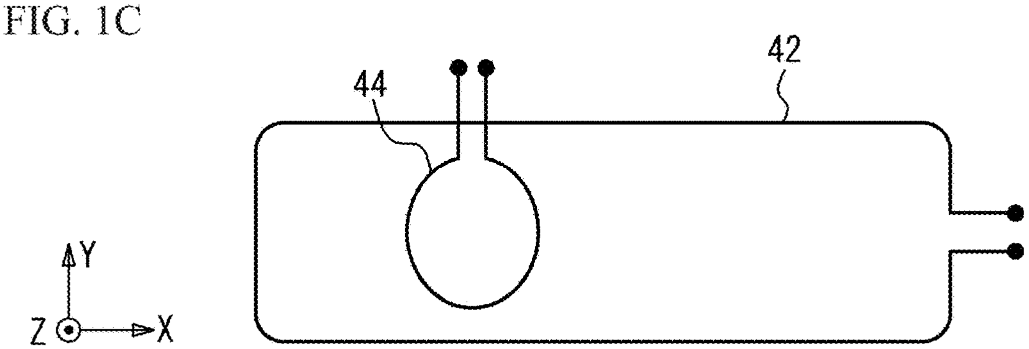
FIG. 1C is a diagram illustrating a transceiver coil and a receiver coil provided in a detection head.

FIG. 1C is a diagram illustrating the transceiver coil 42 and the receiver coil 44 provided in the detection head 40. As illustrated in FIG. 1C, the receiver coil 44 is disposed inside the transceiver coil 42, which forms a rectangular coil. The receiver coil 44 is, for example, a circular coil, but may have other configurations.

Figure 2A:
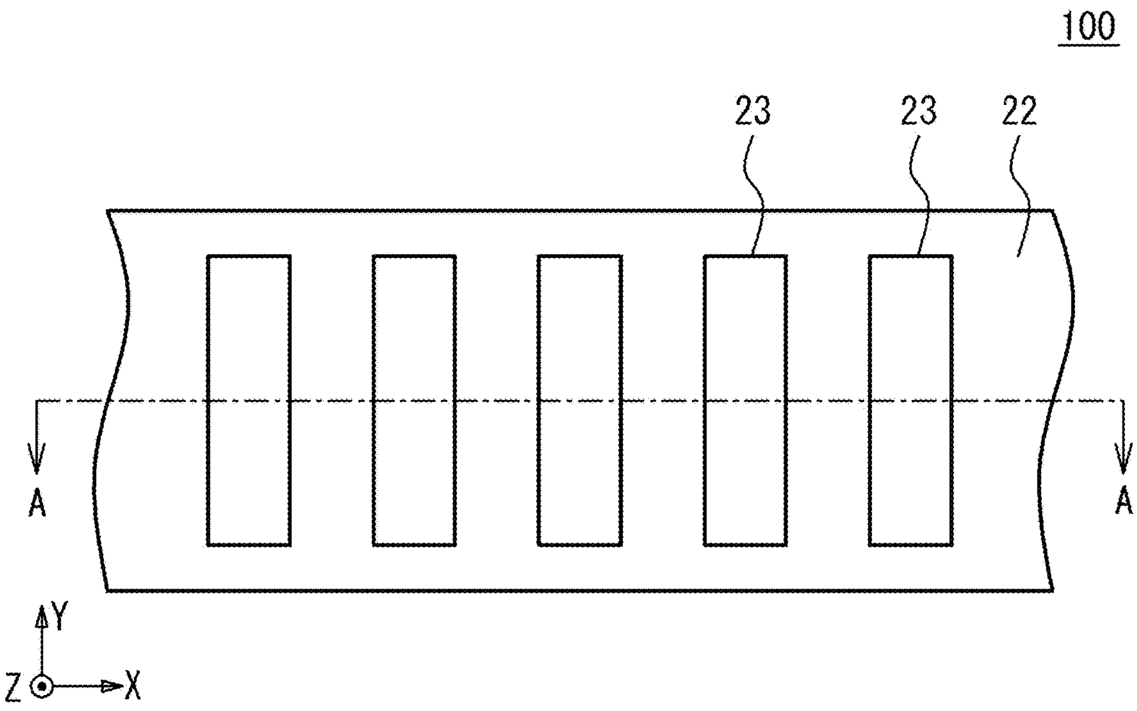
FIG. 2A is a plan view illustrating a scale according to a first embodiment.
Figure 2B:
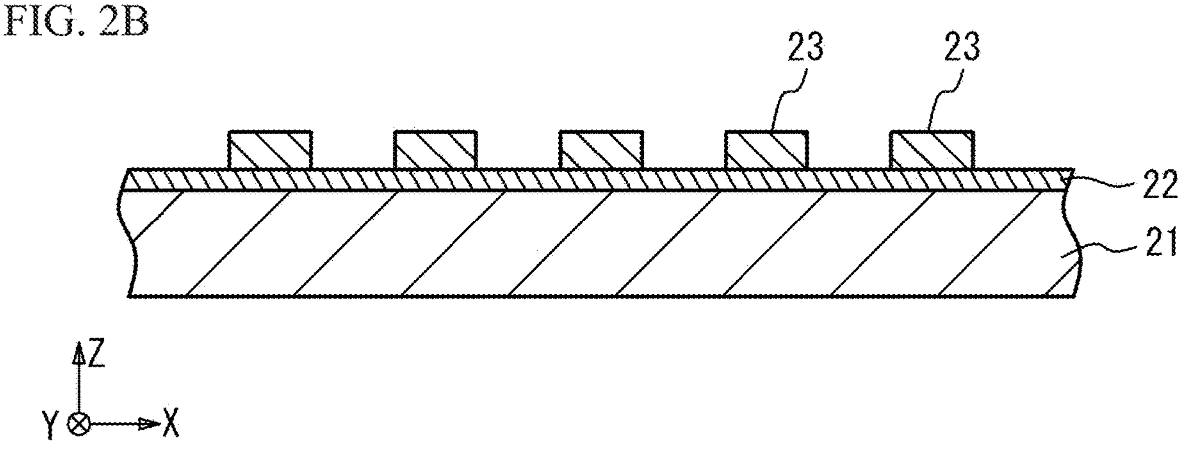
FIG. 2B is a cross-sectional view taken along a line A-A in FIG. 2A.

FIG. 2A is a plan view illustrating the scale 100 according to the first embodiment. FIG. 2B is a cross-sectional view taken along a line A-A in FIG. 2A. As illustrated in FIG. 2A and FIG. 2B, a resin layer 22 is formed on a first face of a substrate 21. The conductor patterns 23 are formed on the resin layer 22, in which a plurality of metal gratings are arranged at predetermined intervals along the X-axis direction. In a plan view seen from the +Z direction, the plurality of conductor patterns 23 have a substantially rectangular shape with the Y-axis direction as the longitudinal direction. The metal gratings are spaced apart from each other. The resin layer 22 may cover the entire first surface of the substrate 21. It is preferable that the resin layer 22 covers at least the entire region in which the conductor patterns 23 are provided. The conductor patterns 23 may be covered by a protective film or the like, but may be exposed to the atmosphere.

The substrate 21 is not particularly limited as long as it has optical transparency. The substrate 21 is, for example, glass. Examples of glass that can be used include quartz glass, soda lime glass, and non-alkali glass. Quartz glass is glass that is composed almost entirely of silicon dioxide ($SiO_2$) and contains very few impurities. Soda lime glass is glass that is mainly composed of silicon dioxide ($SiO_2$) and further contains sodium oxide ($Na_2O$) and calcium oxide (CaO). Non-alkali glass is glass that is mainly composed of silicon dioxide ($SiO_2$) and does not contain alkali components such as sodium and potassium. The thickness of the substrate 21 is, for example, about 0.4 mm or more and 6.0 mm or less.

The resin layer 22 is not particularly limited as long as it is an adhesive resin that has optical transparency. Examples of the resin layer 22 include epoxy resin, polyimide, urethane, and acrylic.

The conductor pattern 23 is not particularly limited as long as it is a metal. The conductor pattern 23 is formed of a conductor such as copper, silver, gold, or aluminum. The thickness of the conductor pattern 23 is, for example, about 3 μm to 30 μm. The width of the conductor pattern 23 in the X-axis direction is, for example, about 500 μm to 3000 μm. The interval between the conductor patterns 23 (from one end of the conductor pattern 23 to the other end of an adjacent conductor pattern 23) is also, for example, about 500 μm to 3000 μm.

Figure 3A:
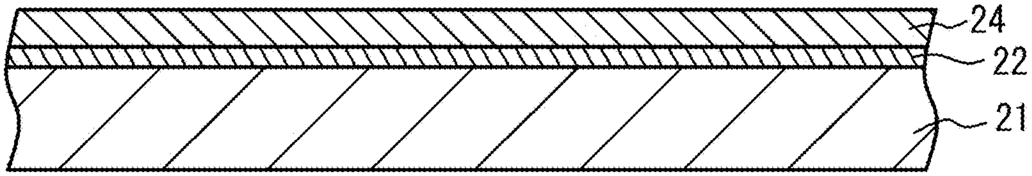
FIG. 3A to FIG. 3F are diagrams illustrating a method of manufacturing a scale.

Next, a method for manufacturing the scale 100 will be described. First, as illustrated in FIG. 3A, an adhesive resin is applied to the first face on the upper side of the substrate 21 to form the resin layer 22. As an example, the resin layer 22 having a thickness of 30 μm is formed. For example, a liquid adhesive resin may be applied uniformly to the first face of the substrate 21, or a sheet-like adhesive resin may be laminated. Thereafter, a metal foil 24 (metal-containing layer) is attached to the resin layer 22 by heat lamination or heat pressing.

Alternatively, a flexible printed circuit board material in which the resin layer 22 and the metal foil 24 are bonded together to form an integral mold may be attached to the substrate 21. As an example, a copper foil having a thickness of 12 μm may be used as the metal foil 24.

Figure 3B:
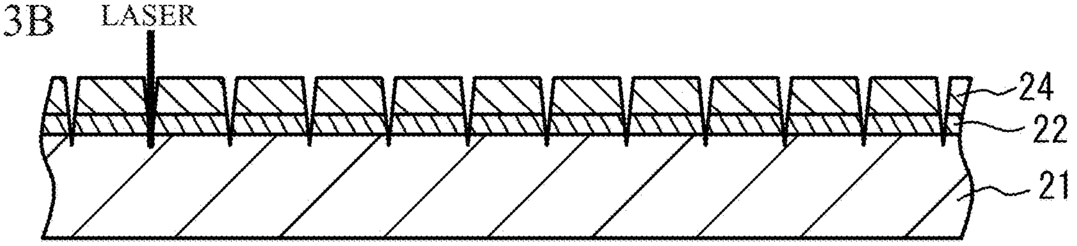
Figure 3C:
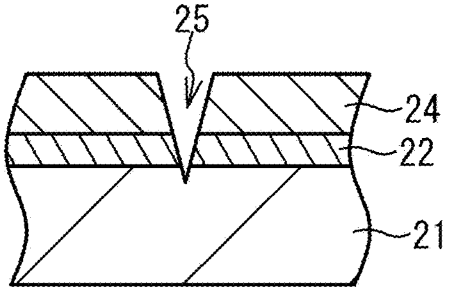

Next, as illustrated in FIG. 3B, ultrashort pulse laser processing is performed by irradiating the metal foil 24 with an ultrashort pulse laser (first laser) from the opposite side of the substrate 21 with a width of about 10 μm to 50 μm. The ultrashort pulse laser is a laser with a very short pulse width (time width) of the order of picoseconds to femtoseconds, and can be irradiated at equal intervals in time with a repetition frequency of, for example, 10 kHz to 4 MHz. By ultrashort pulse laser processing, a groove 25 corresponding to the outline of the conductor pattern 23 is formed in the metal foil 24 as illustrated in FIG. 3C. For example, ultrashort pulse laser processing may be performed using a galvano scanner, or ultrashort pulse laser processing may be performed by moving the workpiece on a precision stage to change the laser spot position on the workpiece. The processed end face is smooth and tapered, so that the cross section of the groove 25 has a V-groove structure. The groove 25 reaches the resin layer 22. Alternatively, the groove 25 may reach the upper face of the substrate 21 and be formed deeper than the upper face of the substrate 21.

Figure 3D:
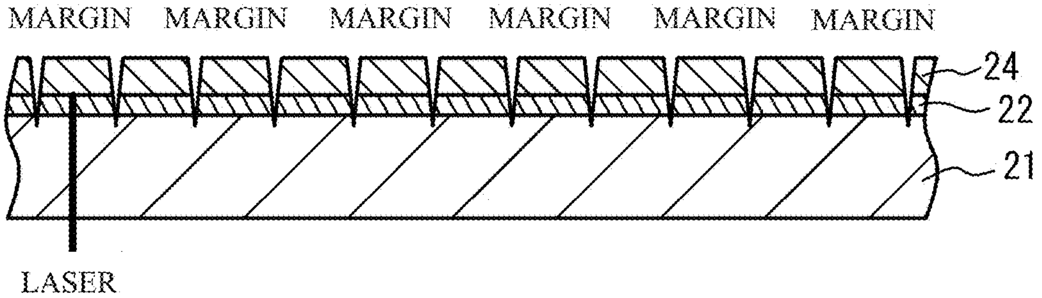
Figure 3E:
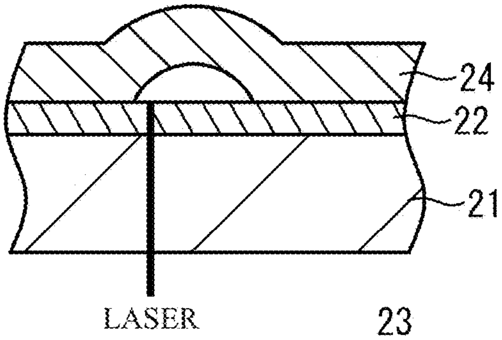

Next, as illustrated in FIG. 3D, a short-pulse laser having a wavelength that transmits glass or resin is focused and irradiated from the second face of the substrate 21 opposite to the first face, at the interface between the resin layer 22 and the metal foil 24. A short-pulse laser is a laser that has a pulse width (time width) of 1 to 100 nanoseconds and is repeatedly irradiated at time intervals of 10 kHz to 1 MHz. For example, an infrared nanosecond laser can be used as the short-pulse laser. When the short-pulse laser is scanned on the outside (margin) of the outline formed by the groove 25, heat is generated mainly at the interface between the resin layer 22 and the metal foil 24 in the margin, and the surface of the resin layer 22 is altered and the adhesive force is lost. As a result, a gap may be generated between the resin layer 22 and the metal foil 24 in the margin, as illustrated in FIG. 3E.

The energy required to alter the resin layer 22 is smaller than the energy required to remove the metal foil 24, and the process can be performed faster and with lower energy than directly removing the metal foil 24. Also, when positioning the scanning position using the short pulse laser, it does not matter if the short pulse laser protrudes slightly to the width of the groove around the margin, so the positioning of the short pulse laser can be performed using a low-precision galvano scanner.

Furthermore, since a short-pulse laser with a large spot that reduces the energy density of the irradiated pulse can be used, removal processing can be easily performed at high speed. For example, when removing grooves from the front surface by laser ablation using an expensive ultrashort pulse laser, in order to remove 5% of the pattern outline from the entire area, it is necessary to repeat pulse irradiation with a laser output of 20 W and a Φ20 μm spot at a 5 μm pitch in the X-Y direction, 10 times. On the other hand, when a low-output, inexpensive infrared short-pulse laser is used to perform peeling processing by scanning and irradiating from the back surface at the same speed as the ultrashort pulse laser, even if the area of the margin is 50%, which is 10 times the area of the grooves, if the energy is 5 W, the spot diameter is Φ40 μm, and the pitch is 30 μm in the X-Y direction, the number of pulse irradiations can be one time and peeling can be completed with 1/360 times fewer irradiations per area, so the peeling work can be completed about 36 times faster than the removal processing. Therefore, processing can be performed with good productivity using low-cost production equipment.

Also, by using the peeling process from the back surface in combination, it is possible to shorten the etching process time for the grooves required for the front surface. In order to speed up the tact time, it is not necessary to perform unproductive processing such as dividing the etching process for a large area using multiple ultra-short pulse lasers, which takes time and requires high equipment costs.

Also, the surface after the removal process is prone to stains and defects that are difficult to remove, such as scorching due to strong pulse energy, alteration or dust of the circuit surface, glass powder, and sputtering of molten material. If the entire large area is removed by the removal process, many stains and defects are likely to occur in proportion to the area. In the peeling process, peeling is performed with a single weak pulse, and there is only a small amount of alteration of the resin surface, and no scorching or staining occurs, so there are almost no defects. Since the area of the groove processing performed from the front surface before peeling is small, it is possible to reduce the occurrence of alteration and staining.

Figure 3F:
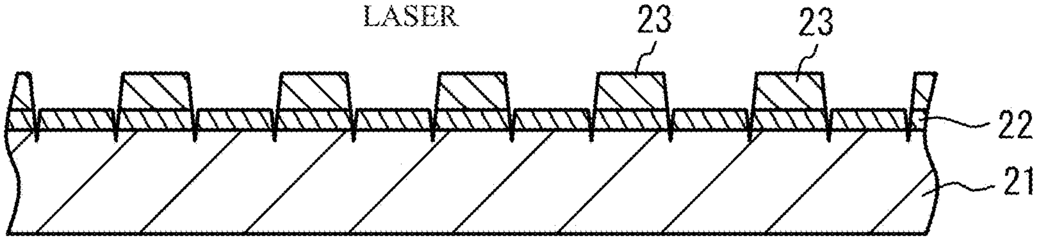

Next, as illustrated in FIG. 3F, the metal foil 24 in the margin scanned by the short pulse laser is peeled off. Thereby, the conductor patterns 23 can be formed. For example, the metal foil 24 of the margin may be peeled off by directly applying an adhesive tape to the margin. Alternatively, the metal foil 24 of the margin may be peeled off by performing brush cleaning, blowing with high-pressure air, ultrasonic cleaning with pure water, or the like. The peeled off metal can be collected and used as a recyclable resource.

Figure 4:
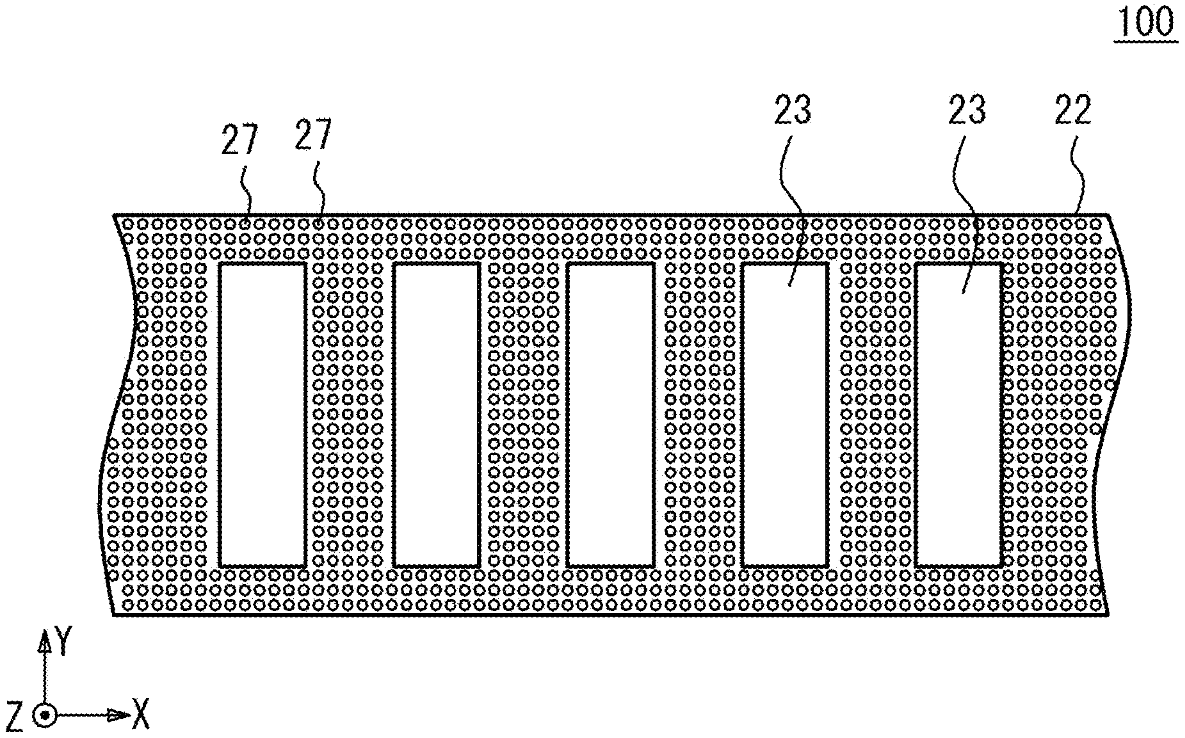
FIG. 4 is a plan view of a scale as seen from above.

FIG. 4 is a plan view of the scale 100 as seen from the top face side. As illustrated in FIG. 4, on the top face of the scale 100, spotted patterns 27 caused by irradiation with a short pulse laser can be seen on the top face of the resin layer 22. For example, when a circular spot light is irradiated as the short pulse laser, the circular spotted patterns 27 are formed to be arranged at a predetermined interval in the two-dimensional directions of the X-axis and Y-axis directions. For example, the spotted patterns 27 are formed at a predetermined interval (for example, 10 μm to 100 μm) along the X-axis direction, and at a predetermined interval (for example, 10 μm to 100 μm) along the Y-axis direction.

Figure 5:
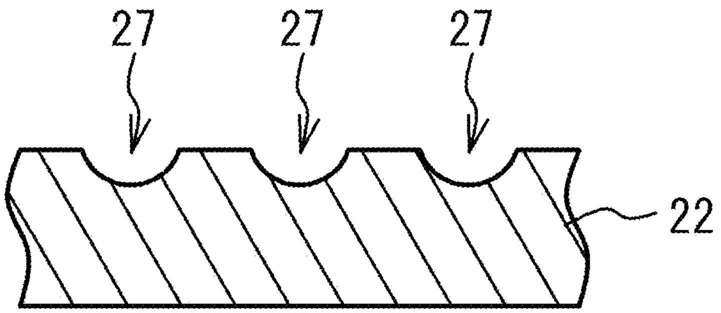
FIG. 5 is a diagram illustrating spotted patterns.

For example, the spotted patterns 27 may be visual patterns formed on the upper face of the resin layer 22, or may be unevenness formed on the upper face of the resin layer 22, as illustrated in FIG. 5. The planar shape of the spotted patterns 27 are affected by the shape of the spot light of the short-pulse laser. Therefore, if the spot light of the short-pulse laser has an approximately circular shape, the planar shape of the spotted patterns 27 will also be approximately circular. If the spot light of the short-pulse laser has an approximately rectangular shape, the planar shape of the spotted patterns 27 will also be approximately rectangular.

Figure 6A:
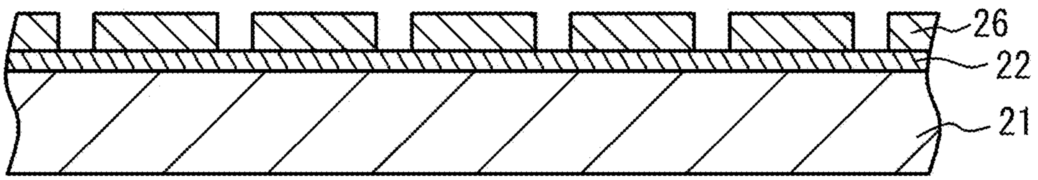
FIG. 6A to FIG. 6F are diagrams illustrating a method of manufacturing a scale.

Next, another manufacturing method of the scale 100 will be described. First, as illustrated in FIG. 6A, a primer resin adhesive is applied to the first face on the upper side of the substrate 21 to form the resin layer 22. As an example, the resin layer 22 having a thickness of 5 μm is formed.

After that, a metal paste 26 (metal-containing layer) having high adhesion to the primer resin is screen-printed on the resin layer 22. As an example, a silver paste having a thickness of 10 μm can be used as the metal paste 26. The edges of the printed pattern are processed with poor accuracy because the ink spreads, and film thickness distribution, edge roughness, and printing distortion are likely to occur. However, a metal film with a relatively flat and uniform thickness can be obtained near the center of the printed pattern. If the pattern is printed larger than the pattern required for the finished product, including the part that will peel off, a pattern with uniform thickness can be obtained. A rough conductor pattern can be obtained by firing after printing. In the case of parts with complex shapes that cannot be screen printed, a conductor solid pattern such as metal foil can be obtained by spraying or brushing the paste agent.

Figure 6B:
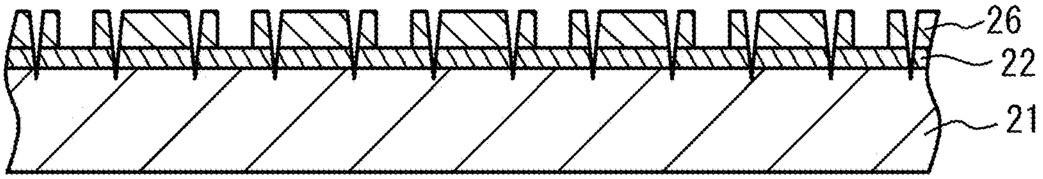
Figure 6C:
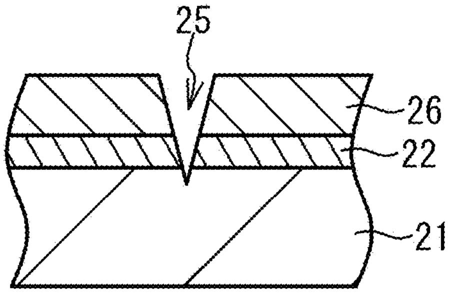

Next, as illustrated in FIG. 6B, ultrashort pulse laser processing is performed by irradiating an ultrashort pulse laser with a width of about 10 μm to 50 μm to a place inside the edge of the printed pattern that has a uniform film thickness. By ultrashort pulse laser processing, the groove 25 corresponding to the outline of the conductor patterns 23 is formed in the metal paste 26 as illustrated in FIG. 6C. For example, ultrashort pulse laser processing may be performed using a galvano scanner, or the workpiece may be processed while changing the laser spot position on a precision stage. The processed end face is smooth and tapered, so that the cross section of the groove 25 has a V-groove structure. The groove 25 reaches the resin layer 22. Alternatively, the groove 25 may reach the upper face of the substrate 21 and be formed deeper than the upper face of the substrate 21.

Figure 6D:
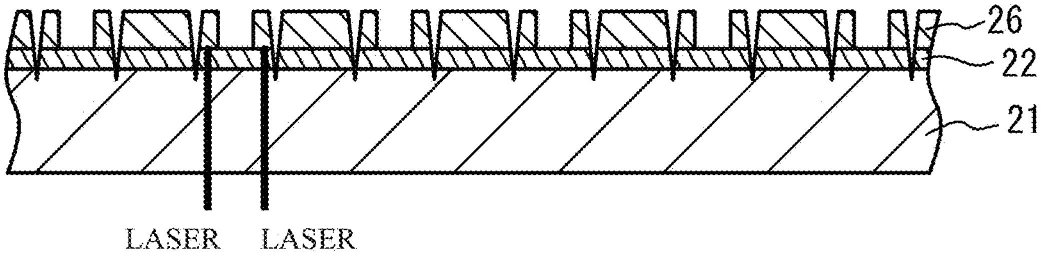
Figure 6E:
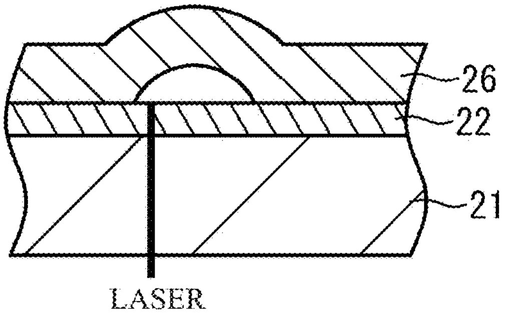

Next, as illustrated in FIG. 6D, a short pulse laser having a wavelength that transmits glass or resin is focused and irradiated from the second face opposite to the first face of the substrate 21 to the interface between the resin layer 22 and the metal paste 26. When the short pulse laser is scanned over the margin (area other than the conductor pattern 23) separated by the groove 25, heat is generated mainly at the interface between the resin layer 22 and the metal paste 26 in the margin, and the surface of the resin layer 22 is altered and the adhesive force is lost. As a result, as illustrated in FIG. 6E, a gap may occur between the resin layer 22 and the metal paste 26 in the margin.

The energy required for altering the resin layer 22 is smaller than that required for removing the metal paste 26, and the process can be performed faster and with lower energy than directly removing the metal paste 26. In addition, since it is acceptable for the short-pulse laser to protrude slightly beyond the width of the groove, a low-precision galvano scanner can be used to position the short-pulse laser. Since defects are unlikely to occur even if the part without the silver paste pattern is irradiated, it is acceptable to irradiate a wide range taking into account the edge position variation of the paste pattern. If an attempt is made to remove the part without paste from the surface or the part with a film thickness distribution, the processing depth will vary over a wide range, and strong energy will be applied to the part only of the resin, which will cause the resin to burn or peel off. The peeling process can reduce the probability of defects compared to the case of processing only by removal. In addition, it is acceptable to use a short-pulse laser with a large spot that reduces the energy density, making it easier to process at high speed.

Figure 6F:
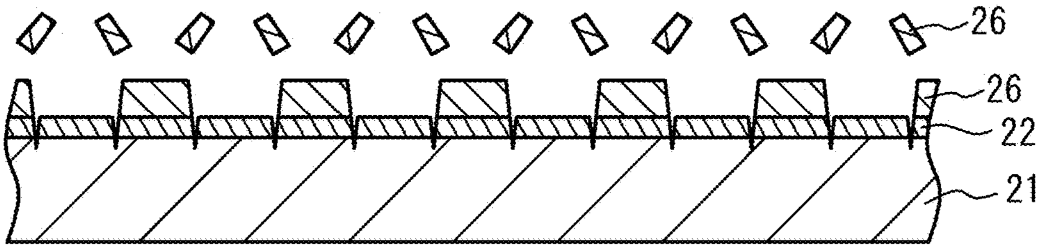

Next, as illustrated in FIG. 6F, the metal paste 26 in the margin scanned by the short-pulse laser is peeled off. For example, the metal paste 26 in the margin may be peeled off by directly applying an adhesive tape to the margin. Alternatively, the metal paste 26 in the margin may be peeled off by brush cleaning, blowing with high-pressure air, ultrasonic cleaning with pure water, or the like. The peeled off metal can be collected and used as a recyclable resource.

According to this embodiment, lithography, chemical etching, plating or the like can be omitted, so that chemical solution management and waste liquid treatment are not required, and the number of processes can be reduced. In addition, since processing can be performed by direct drawing with a laser, circuits can be formed with good productivity even for components with complex shapes for which it is difficult to use a lithography process using a photomask.

Second Embodiment

In the first embodiment, a scale having a structure in which the resin layer 22 is formed on the substrate 21 is described, but in the second embodiment, a case in which the substrate is made of resin is described.

Figure 7A:
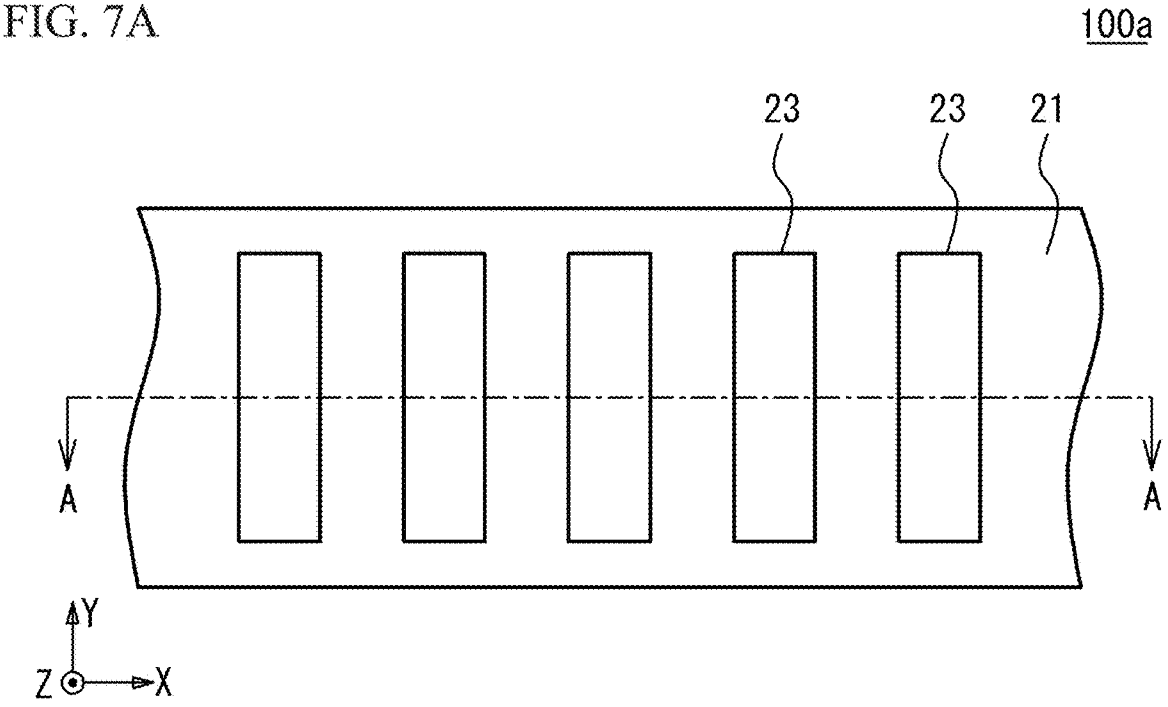
FIG. 7A is a plan view illustrating a scale according to a second embodiment.
Figure 7B:
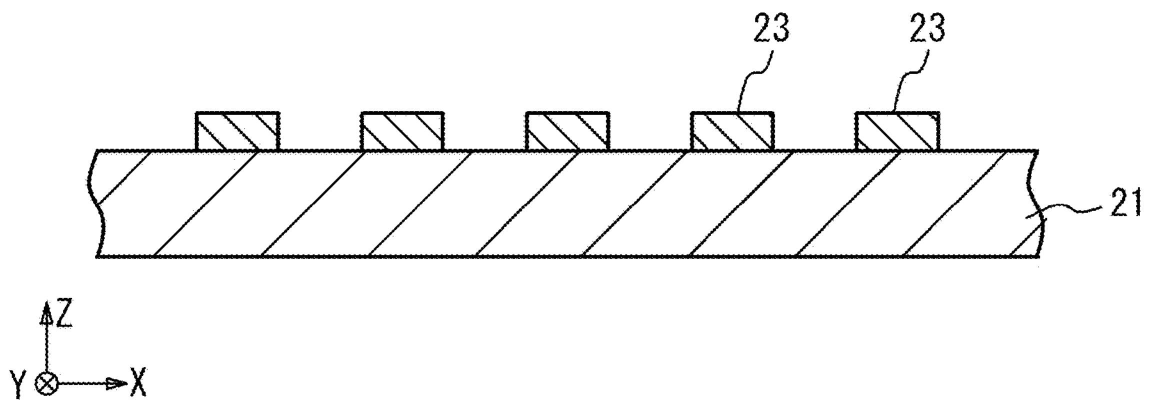
FIG. 7B is a cross-sectional view taken along a line A-A in FIG. 7A.

FIG. 7A is a plan view illustrating a scale 100*a* according to the second embodiment. FIG. 7B is a cross-sectional view taken along a line A-A in FIG. 7A. As illustrated in FIG. 7A and FIG. 7B, the conductor patterns 23 having a plurality of metal gratings arranged at predetermined intervals along the X-axis direction is formed on a first face of the substrate 21. In this embodiment, the substrate 21 is made of a resin having optical transparency. In this manner, the entire substrate 21 may be made of resin. In this embodiment, the thickness of the substrate 21 is, for example, about 0.1 mm or more and 100 mm or less.

Although resin often has a larger coefficient of thermal expansion than glass and the like, the resin has the advantage of being less likely to break, light, thin, and allowing freedom of complex shapes. Therefore, the scale 100*a* according to this embodiment has the advantage of being less likely to break, light, and allowing freedom of shape. For example, scale processing can be performed on a part having a shape in which a flat scale and a spindle to which it is attached are integrated.

Figure 8A:
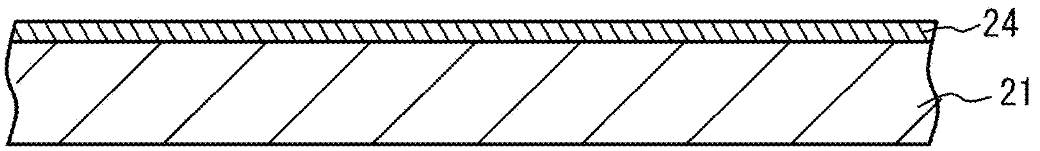
FIG. 8A to FIG. 8D are diagrams illustrating a method of manufacturing a scale.

Next, a method for manufacturing the scale 100*a* will be described. First, as illustrated in FIG. 8A, the metal foil 24 (metal-containing layer) is attached to the first face on the upper side of the substrate 21 made of resin by thermal lamination or thermal press processing.

Figure 8B:
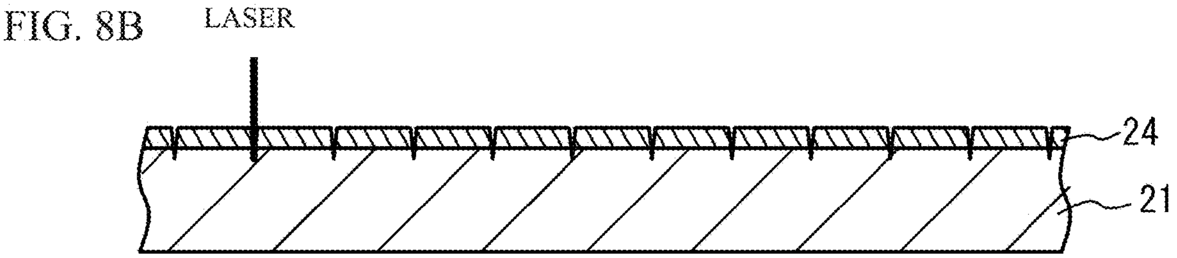

Next, as illustrated in FIG. 8B, an ultrashort pulse laser (first laser) is irradiated to the metal foil 24 from the opposite side to the substrate 21 with a width of about 10 μm to 50 μm, thereby performing ultrashort pulse laser processing. The grooves formed by ultrashort pulse laser processing reach the substrate 21. Alternatively, the grooves may reach the top face of the substrate 21 and may be formed deeper than the top face of the substrate 21.

Figure 8C:
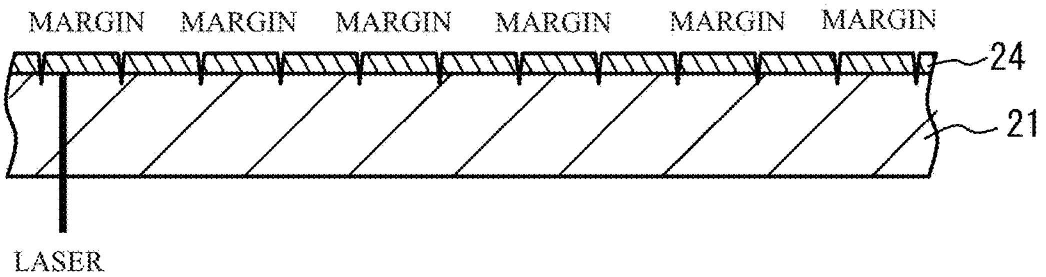

Next, as illustrated in FIG. 8C, a short-pulse laser having a wavelength that transmits glass or resin is focused and irradiated from the second face of the substrate 21 opposite to the first face, at the interface between the substrate 21 and the metal foil 24. When the short-pulse laser is scanned on the outside of the outline formed by the groove (margin), heat is generated mainly at the interface between the substrate 21 and the metal foil 24 in the margin, and the surface of the substrate 21 is altered and the adhesive force is lost.

Figure 8D:
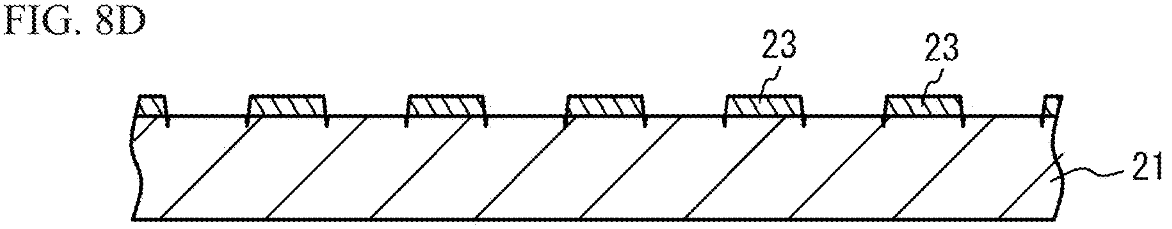

Next, as illustrated in FIG. 8D, the metal foil 24 in the margin scanned with the short-pulse laser is peeled off. This allows the conductor patterns 23 to be formed. For example, the metal foil 24 in the margin may be peeled off by directly applying an adhesive tape to the margin. Alternatively, the metal foil 24 in the margin may be peeled off by performing brush cleaning, blowing with high-pressure air, ultrasonic cleaning with pure water, or the like. The peeled off metal can be recovered and recycled.

In this embodiment, lithography, chemical etching, plating or the like can be omitted, so that chemical solution management and waste liquid treatment are not required, and the number of processes can be reduced. In addition, since processing can be performed using a laser, it is possible to form parts with complex shapes that are difficult to use lithography processes for, and resins that are not resistant to the chemicals used in lithography, such as those that dissolve and deform.

Resin can be easily molded into various shapes using injection molding or a 3D printer. Therefore, resin can be processed into various shapes such as a column, a cylinder, a disk, or a sphere. Scales having these shapes can be used to form encoders used in robot joints, for example. Note that even if the scale has a structure with a resin layer on glass, it is possible to process the structure into these shapes.

Figure 9:
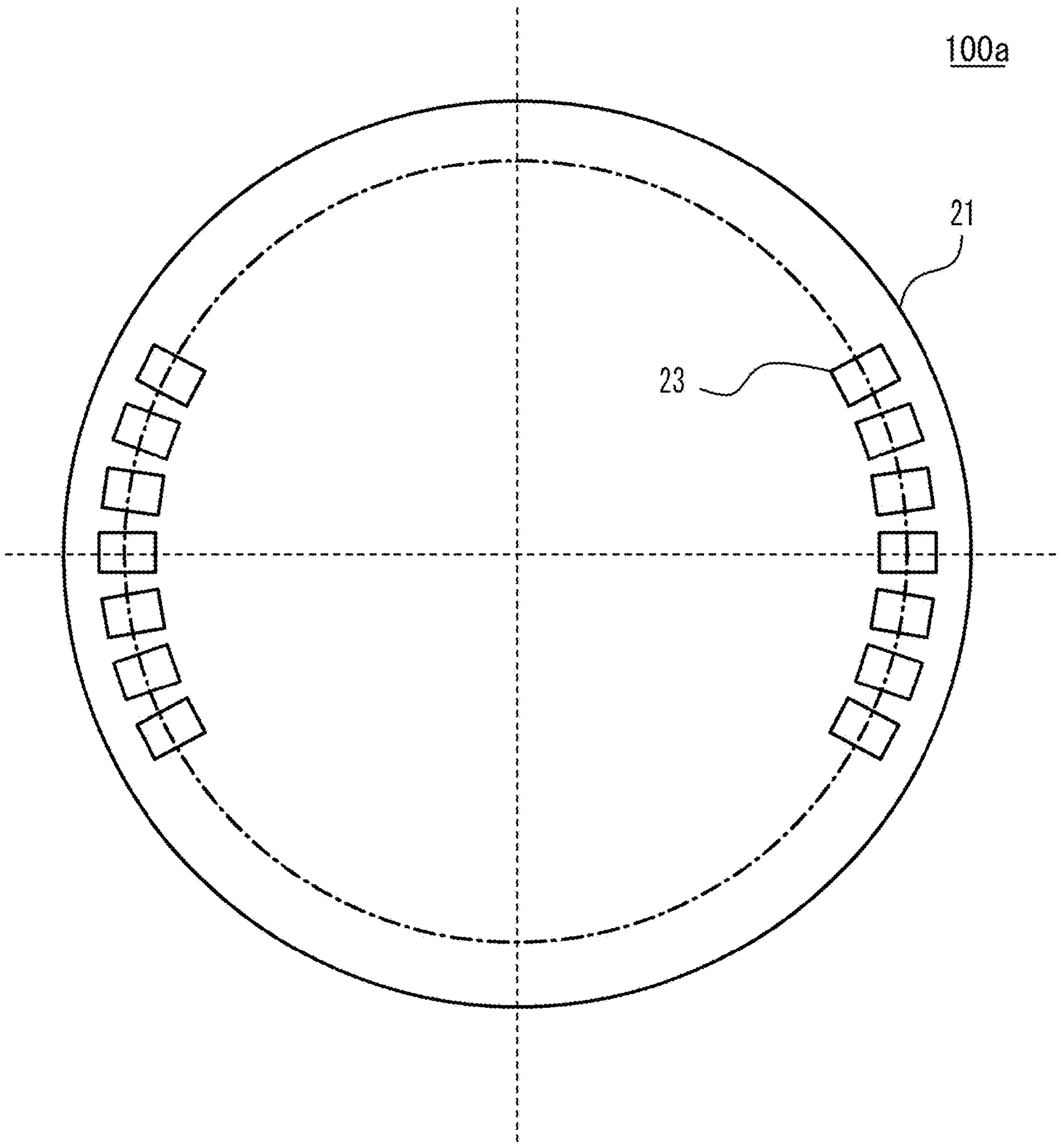
FIG. 9 is a plan view illustrating a scale.

For example, the scale 100*a* may have an approximately circular shape in a plan view. FIG. 9 is a plan view illustrating the scale 100*a* in this case. As illustrated in FIG. 9, in the scale 100*a*, the substrate 21 has an approximately circular shape in a plan view. The conductor patterns 23 are arranged on the first face on the upper face side of the substrate 21, on the inside of the outer periphery, along the outer periphery at a predetermined interval. In FIG. 7A, the conductor patterns 23 are arranged along a dashed line. The cross-sectional shape along this dashed line is as described in FIG. 7B.

Figure 10:
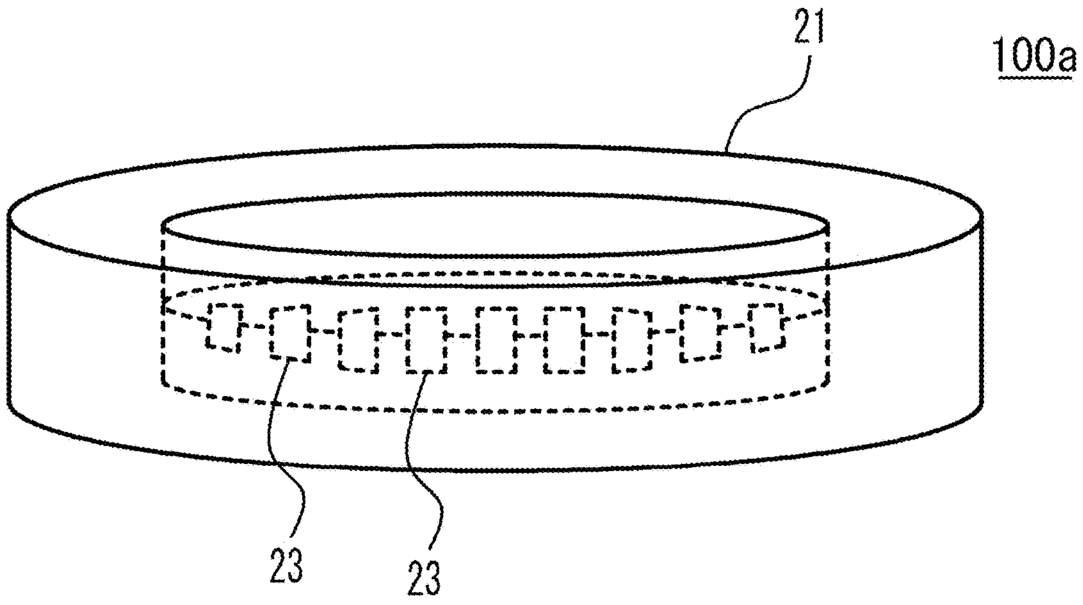
FIG. 10 is a diagram illustrating a scale.

Alternatively, the scale 100*a* may have a substantially cylindrical shape. FIG. 10 is a diagram illustrating the scale 100*a* in this case. As illustrated in FIG. 10, in the scale 100*a*, the substrate 21 has a cylindrical shape. On the inner surface of this cylindrical shape, the conductor patterns 23 are arranged at a predetermined interval. For example, the conductor patterns 23 are arranged along the circumferential direction on the inner surface of the cylindrical shape.

Figure 11:
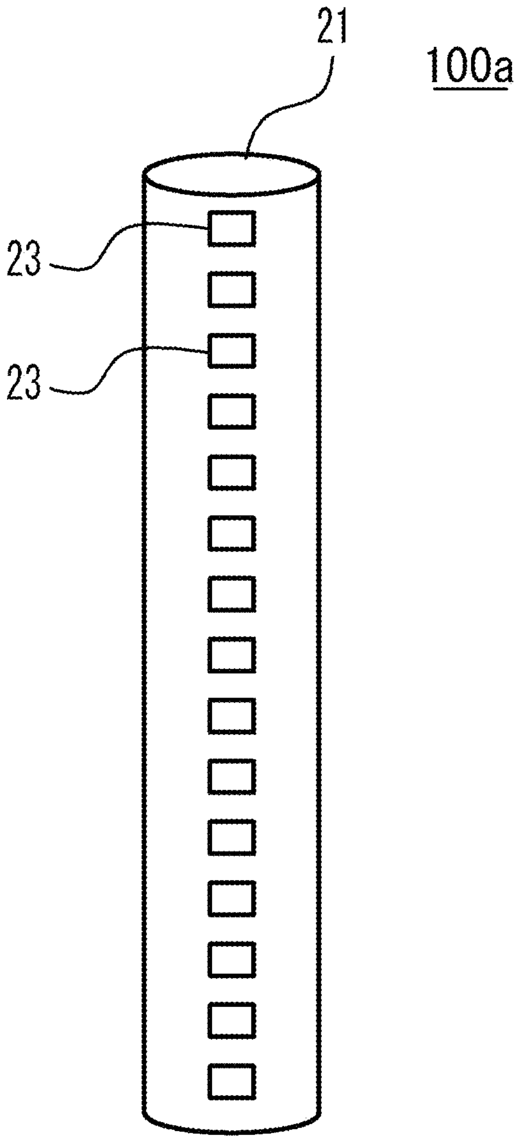
FIG. 11 is a diagram illustrating a scale.

Alternatively, the scale 100*a* may have a substantially column shape. FIG. 11 is a diagram illustrating the scale 100*a* in this case. As illustrated in FIG. 11, in the scale 100*a*, the substrate 21 has a column shape. The conductor patterns 23 are arranged at predetermined intervals on the outer surface of the column shape. For example, the conductor patterns 23 are arranged along the axial direction of the column shape.

Figure 12:
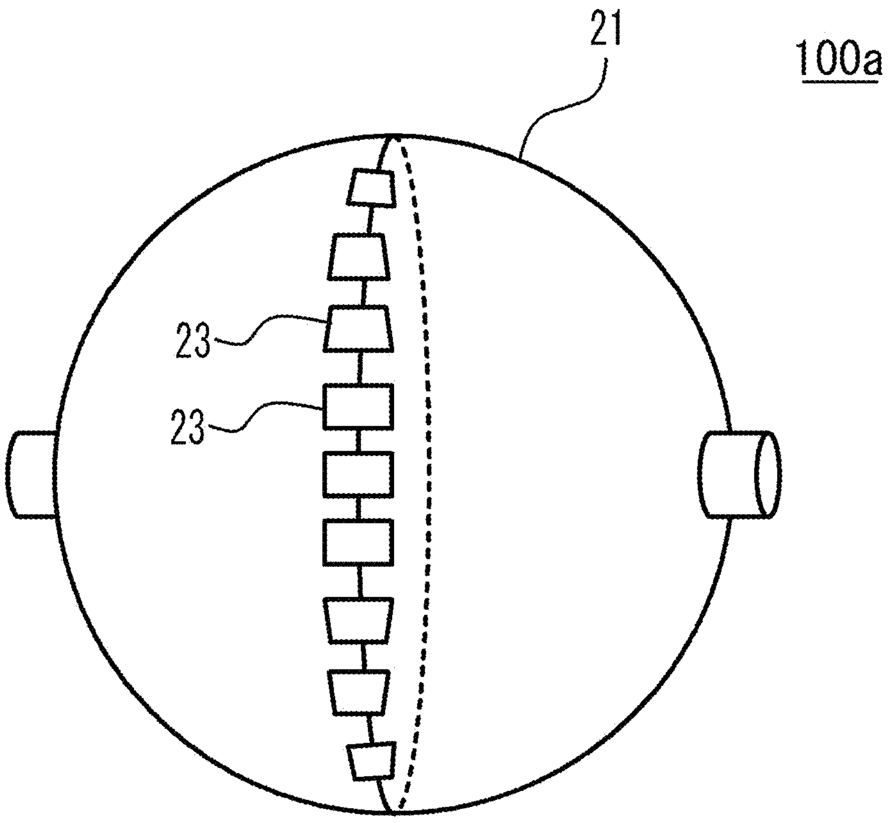
FIG. 12 is a diagram illustrating a scale.

Alternatively, the scale 100*a* may have a substantially spherical shape. FIG. 12 is a diagram illustrating the scale 100*a* in this case. As illustrated in FIG. 12, in the scale 100*a*, the substrate 21 has a spherical shape. The conductor patterns 23 are arranged at predetermined intervals around the outer periphery of this sphere. For example, the conductor patterns 23 are arranged along a predetermined circumference of the sphere.

The present invention is not limited to the specifically disclosed embodiments and variations but may include other embodiments and variations without departing from the scope of the present invention.

What is claimed is:

1. A manufacturing method of a scale comprising:

forming a metal-containing layer on a resin layer that is provided on at least a first face of a substrate;

forming an outline of a pattern on the metal-containing layer by irradiating a first laser to the metal-containing layer from a side opposite to the substrate;

irradiating a second laser to a margin outside of the outline of the metal-containing layer from a side of a second face of the substrate opposite to the first face; and peeling a part of the metal-containing layer corresponding to the margin.

2. The method as claimed in claim 1, wherein an ultrashort pulse laser is used as the first laser, and wherein a short pulse laser is used as the second laser.

3. The method as claimed in claim 1, wherein the substrates is made of a resin.

4. The method as claimed in claim 1, wherein the substrate has a structure in which the resin layer is provided on a glass substrate.

5. The method as claimed in claim 1, wherein the outline is formed by forming a groove reaching the resin layer, when irradiating the first laser.

6. The method as claimed in claim 1, wherein the substrate has a structure in which the resin layer is provided on a glass substrate, and wherein the outline is formed by forming a groove reaching the glass substrate when irradiating the first laser.

7. The method as claimed in claim 1, wherein the substrate has a flat board shape.

8. The method as claimed in claim 1, wherein the substrate has a spherical shape or a cylindrical shape.

9. A scale comprising:

an optically transparent substrate that has a resin layer on a first face thereof; and a plurality of conductor patterns that are provided on the resin layer and have a structure in which a plurality of metal gratings are formed at intervals, wherein spotted patterns are formed at intervals along two dimensional directions on a region of the resin layer other than the conductor patterns, and wherein the spotted patterns are not formed on a region of the resin layer where the conductor patterns are provided.

10. The scale as claimed in claim 9, wherein the spotted patterns are unevenness formed on a surface of the resin layer.

11. An encoder comprising a scale as claimed in claim 9.

12. The scale as claimed in claim 9, wherein each shape of the spotted patterns is in accordance with a planar shape of a spot light of a short-pulse laser.

13. The scale as claimed in claim 9, wherein the optically transparent substrate is made of a resin.

14. The scale as claimed in claim 9, wherein the optically transparent substrate has a structure in which the resin layer is provided on a glass substrate.

15. The scale as claimed in claim 9, wherein grooves are formed on the resin layer as outlines of the plurality of conductor patterns.

16. The scale as claimed in claim 9, wherein the substrate has a structure in which the resin layer is provided on a glass substrate, and wherein grooves are formed on the resin layer as outlines of the plurality of conductor patterns so as to reach the glass substrate.

* * * * *